Patented June 30, 1953

2,644,022

UNITED STATES PATENT OFFICE 2,644,022

ALKALINE STORAGE BATTERY WITH NEGATIVE IRON ELECTRODE

Joseph Donald Moulton, West Orange, and Edward F. Schweitzer, Bloomfield, N. J., and Thomas R. Briggs, Ithaca, N. Y., assignors to Thomas A. Edison, Incorporated, West Orange, N. J., a corporation of New Jersey No Drawing. Application April 28, 1951, Serial No. 223,656

9 Claims. (Cl. 136—25)

This invention relates to improvements in storage batteries of the type which use an alkaline electrolyte and a negative "iron electrode," the term "iron electrode" being herein used to mean an electrode whose active material is electrolytically-active iron—i. e., initially a mixture of metallic iron and ferrous oxide which when formed is essentially finely-divided metallic iron. More particularly, the invention relates to improvements which reduce substantially the evolution of hydrogen gas during idle stand and low-rate discharge periods of such batteries.

In its more practical aspects, the present invention is concerned particularly with the well-known commercial nickel-iron-alkaline storage battery comprising an alkaline electrolyte and a negative electrode whose active material is electrolytically-active iron, as abovementioned, and a positive electrode whose active material is nickel oxide. A prime objective of the invention is to reduce the hydrogen evolution in this battery without adversely affecting its performance or electrical capacity. More particularly, it is an object of our invention so to reduce the hydrogen evolution from such nickel-iron-alkaline batteries as to meet the Navy's specifications for the use of these batteries in submarines.

Although our invention has special importance in broadening the field of use of the nickel-iron-alkaline battery, and is herein described in connection with this battery, it is to be understood that we intend no unnecessary limitation of our invention to batteries using positive electrodes of nickel oxide since the invention, from a general standpoint, has application to any battery using iron electrodes in an alkaline electrolyte regardless of the composition of the active material of the other electrode.

Concomitant with our objective of reducing hydrogen evolution in the batteries described are the objectives of effecting this desired result by simple and economical means without adversely affecting the battery performance and electrical capacity to any appreciable extent. These and other objects and features of our invention will be apparent from the following description and the appended claims.

The source of evolved hydrogen gas in the nickel-iron-alkaline storage battery during idle stand and low-rate discharge is the iron electrode. Extensive research has shown that all electrolytically-active iron materials which are now known evolve hydrogen at relatively high rates when allowed to stand in an alkaline electrolyte solution such as potassium hydroxide or a mixture of potassium and lithium hydroxides. Efforts to inhibit this evolution by the use of agents added to the electrolyte solution have not been successful since those agents which have an appreciable inhibitive action are unsuitable in other respects such as in being subject to decomposition during electrolytic cycling of the battery or in causing adverse effects on electrical capacity or performance of the battery.

According to our invention, we have found a group of agents which, when added directly to the active iron material of the negative electrode, are effective in inhibiting hydrogen evolution to a very considerable extent without appreciably affecting the battery performance or electrical capacity. We have found that certain inorganic materials such as those of cadmium and antimony are particularly efficacious as such agents. For maximum effectiveness, these materials should be present in a finely-divided state and should be dispersed through the active iron material of the negative electrode. Cadmium and/or antimony may be used in elemental form, but it is difficult in practice to provide these metals in a finely-divided state. Certain compounds of these materials, however, can be easily obtained in, or can be ground to, the required state of fineness and are therefore preferred. The compounds which are suitable include those whose anions or other combined elements or element groups will not alter the alkaline electrolyte, will not destroy the inhibiting action of the cadmium and antimony, and will not promote corrosion of the iron. Thus, corrosive compounds such as sulphides and chlorides are excluded as are also compounds which might react with the electrolyte to precipitate compounds of potassium and/or lithium as the case may be. On the other hand, any one or more of the following compounds are suitable: the oxides, hydroxides and hydrated oxides of cadmium and antimony, including the antimonic and antimonous acids and their alkali metal salts. It is believed that these suitable compounds break down into finely-divided metallic cadmium or antimony, as the negative electrode is charged or formed, and that it is the elemental cadmium or antimony, present in the negative electrode in a finely-divided state, that effects the desired inhibiting action on hydrogen evolution.

The addition agents formed of cadmium and antimony materials—the terms "cadmium material" and "antimony material" being herein used to include the elemental metals and their suitable compounds herein defined—may be used either singly or in combination, but combinations of cadmium and antimony materials in certain proportions, hereinafter specified, have given the best overall results of producing maximum reduction in hydrogen evolution with the least loss in electrical performance or capacity.

Addition agents of cadmium material are preferably used in the form of cadmium oxide. We have found that when cadmium oxide is added to the electrolytically-active iron mix of the negative electrode of an experimental nickel-iron-alkaline battery in amounts containing 0.1%, 1% and 10% of cadmium by weight of the iron, there are effected reductions in hydrogen evolution of 13.5%, 45.3% and 52.6%, respectively, during a 72-hour idle stand after the battery is fully charged. Moreover, it was found that the 0.1% addition produced no noticeable reduction in electrical capacity, and that the 1% addition produced only a slight reduction as of the order of a few per cent; however, the 10% addition produced a reduction in electrical capacity of the order of 10%.

Agents of antimony material are also preferably provided in compound form for the reasons above described. A preferred antimony compound is antimony pentoxide ($Sb_2O_5$). We have found that when antimony pentoxide is added in finely-divided state to the electrolytically-active iron mix of the negative electrode of an experimental nickel-iron-alkaline battery in amounts containing 0.1%, 1% and 10% of antimony by weight of the iron mix, there are effected reductions in hydrogen evolution of 24.8%, 42.3% and 99.2% respectively during a 72-hour idle stand after charge. Moreover, we have found that the 0.1% and 1% additions produce only a slight reduction in the cell capacity of the order of 5%, but that the 10% addition produces a great reduction in the cell capacity of the order of 90%.

The foregoing results show that with a single addition agent of either cadmium oxide or antimony pentoxide, the maximum reduction in hydrogen evolution, which is obtainable without an appreciable accompanying loss in electrical cell capacity, is of the order of 45%. For instance, such maximum benefit is obtained with the use of about 1% of the cadmium or antimony material. A greater addition of the order of 10% of the cadmium material produces only a slightly greater reduction in hydrogen evolution accompanied by a slightly greater reduction in cell capacity. On the other hand, a greater addition of the order of 10% of the antimony material produces a very great reduction in hydrogen evolution, but this greater addition is not practical since it produces also a very great reduction in cell capacity.

Although the foregoing results show that the use of single addition agents of cadmium and antimony materials produces very marked reductions in hydrogen evolution and for this reason extends the field of use of alkaline storage batteries using iron electrodes, a still greater reduction in hydrogen evolution is desirable in order to meet more fully the aforestated objectives of our invention. We have found that a further reduction in hydrogen evolution is obtainable by the use of dual addition agents including both cadmium and antimony materials. It is however usually necessary that the percentage of antimony material be much smaller than that of the cadmium material in these dual addition agents in order to preserve the electrical capacity of the battery. For example, a dual addition agent comprising approximately 1% cadmium added as cadmium oxide and 0.1% antimony material added as antimony pentoxide will reduce hydrogen evolution by about 70% on a 72-hour idle stand after full charge. Moreover, this dual addition agent does not produce any noticeable reduction in electrical capacity of the battery. Thus, the dual agent is effective in obtaining an approximately 50% greater reduction in hydrogen evolution than is obtainable by using either of the single agents above described.

Another very effective antimony compound which may be used with cadmium oxide to form a dual addition agent is potassium acid pyro antimonate ($H_2K_2Sb_2O_7.4H_2O$). A dual agent comprising approximately 1% cadmium added as cadmium oxide and 0.1% antimony added as the antimonate was found to reduce hydrogen evolution by 72% during a 72-hour idle stand without reducing cell capacity to any appreciable extent.

Other antimony compounds have been tested and found to work beneficially with cadmium oxide as dual agents but they have less inhibitive action on hydrogen evolution than do the agents comprising the preferred antimony compound of antimony pentoxide and potassium acid pyro antimonate. Also, many of these further antimony compounds do effect an appreciable reduction in electrical cell capacity. The table below shows comparative results from dual agents of 1% cadmium added as cadmium oxide and 0.1% antimony added as the respective further antimony compound:

| Approximately 0.1% Antimony Compound Used With 1% Cadmium Oxide | Reduction in Electrical Cell Capacity | Percent Decrease in Hydrogen Evolution During 72-Hour Idle Stand After Full Charge |
|---|---|---|
| Antimony Trioxide $Sb_2O_3$ | Approx. 20% | 57 |
| Antimonous Acid, Ortho, $H_3SbO_3$. | Approx. 10% | 45 |
| Sodium Pyro Antimonate $Na_2A_2Sb_2O_7.H_2O$. | Approx. 35% | 68 |
| Potassium Meta Antimonate $KSbO_3$. | Approx. 15% | 57 |
| Sodium Meta Antimonate $2NaSbO_3.7H_2O$. | None | 48 |

The embodiments of our invention herein described are intended to be illustrative and not limitative of our invention since other compounds within the scope of our invention herein defined will be apparent in the light of the present disclosure to those skilled in the art.

We claim:

1. In a storage battery: an alkaline electrolyte; and a charged negative electrode comprising electrolytically-active iron and an addition agent in an amount equal to at most 10% by weight of the iron, said addition agent comprising one or more finely-divided metals selected from the group consisting of cadmium and antimony.

2. In a storage battery: an alkaline electrolyte; and a charged negative electrode comprising electrolytically-active iron and an addition agent in an amount of the order of 1% or less by weight of the iron, said addition agent being dispersed throughout said iron and comprising a finely-divided metal selected from the group consisting of cadmium and antimony.

3. In a storage battery: an alkaline electrolyte; and a negative electrode comprising electrolytically-active iron and an addition agent in an amount equal to 1% or less by weight of the iron, said addition agent being selected from the group consisting of cadmium and antimony materials whose anions or other combined elements or element groups are incapable of altering the battery electrolyte and are non-corrosive with respect to the iron.

4. In a storage battery: an alkaline electrolyte; and a charged negative electrode comprising electrolytically-active iron and an addition agent in an amount equal to at most 10% by weight of the iron of one or more members of the group consisting of metallic cadmium and the oxides, hydroxides, and hydrated oxides of cadmium.

5. In a storage battery: an alkaline electrolyte; and a charged negative electrode comprising electrolytically-active iron and an addition agent in an amount of the order of 1% or less by weight of the iron of one or more members of the group consisting of the oxides, hydroxides and hydrated oxides of antimony, the antimonous and antimonic acids and their alkali metal salts.

6. In a storage battery: an alkaline electrolyte; and a negative electrode comprising electrolytically-active iron and a dual addition agent dispersed through the iron and of the order, by weight of the iron, of 1% cadmium oxide and 0.1% of an antimony material selected from the group consisting of antimony pentoxide and potassium acid pyro antimonate.

7. In a storage battery: an alkaline electrolyte; and a negative electrode comprising electrolytically-active iron and a dual addition agent associated with the iron and of the order, by weight of the iron, of 1% cadmium oxide and 0.1% of an antimony material selected from the group consisting of the oxides, hydroxides and hydrated oxides of antimony and the alkali metal salts of the antimony acids.

8. In a storage battery: an alkaline electrolyte; and a negative electrode comprising electrolytically-active iron containing at most of the order of 1%, by weight of the iron, of an addition agent selected from the group consisting of metallic cadmium, metallic antimony, cadmium oxide, antimony pentoxide and potassium acid pyro antimonate.

9. A storage battery comprising a positive electrode having an active material of nickel oxide, an alkaline electrolyte, a negative electrode having an active material of electrolytically-active iron and an addition agent associated with the said electrolytically-active iron and of an amount of the order of 1% by weight of the iron, said addition agent comprising one or more members of the group consisting of cadmium and antimony materials whose anions are non-corrosive with respect to the iron and are incapable of altering the alkaline electrolyte.

JOSEPH DONALD MOULTON.
EDWARD F. SCHWEITZER.
THOMAS R. BRIGGS.

References Cited in the file of this patent

UNITED STATES PATENTS

| Number | Name | Date |
|---|---|---|
| 1,885,451 | Kraenzlein | Nov. 1, 1932 |
| 2,023,717 | Willimek | Dec. 10, 1935 |
| 2,554,125 | Salauze | May 22, 1951 |

FOREIGN PATENTS

| Number | Country | Date |
|---|---|---|
| 331,540 | Great Britain | July 4, 1930 |